United States Patent [19]

Miller

[11] 4,454,589

[45] Jun. 12, 1984

[54] PROGRAMMABLE ARITHMETIC LOGIC UNIT

[75] Inventor: Gary I. Miller, Los Angeles, Calif.

[73] Assignee: The Unite States of America as represented by the Secretary of the Air Force, Washington, D.C.

[21] Appl. No.: 357,440

[22] Filed: Mar. 12, 1982

[51] Int. Cl.³ .................... G06F 7/50; H03K 19/20
[52] U.S. Cl. ................................ 364/716; 364/749
[58] Field of Search ............... 364/716, 736, 749; 307/465

[56] References Cited

U.S. PATENT DOCUMENTS

| | | | |
|---|---|---|---|
| 3,751,650 | 8/1973 | Koehn | 364/716 |
| 3,875,391 | 4/1975 | Shapiro et al. | 235/156 |
| 4,025,771 | 5/1977 | Lynch, Jr. et al. | 235/156 |
| 4,041,461 | 8/1977 | Kratz et al. | 364/200 |
| 4,075,704 | 2/1978 | O'Leary | 364/748 |
| 4,110,822 | 8/1978 | Porter et al. | 364/200 |

OTHER PUBLICATIONS

Kogge, "The Microprogramming of Pipelined Processors", IBM Federal Systems Division, Owego, N.Y., pp. 63-69.

*Primary Examiner*—David H. Malzahn
*Attorney, Agent, or Firm*—Donald J. Singer; Willard R. Matthews

[57] ABSTRACT

A programmable arithmetic logic unit for performing high speed bit sliced, pipelined computations at very low power is fabricated as an LSI component using CMOS/SOS technology. It is microprogrammable and operates in conjunction with a fast microprogram store program memory and controller. Dual input ports which supply data from eight sources are latched and operated on while new data is simultaneously fetched. Instruction bits shift data in either port left or right, select complements and select an operand between device input and output data in one port. The data processed in each port is compared and is added to provide a latched tri-state output to an external device.

5 Claims, 1 Drawing Figure

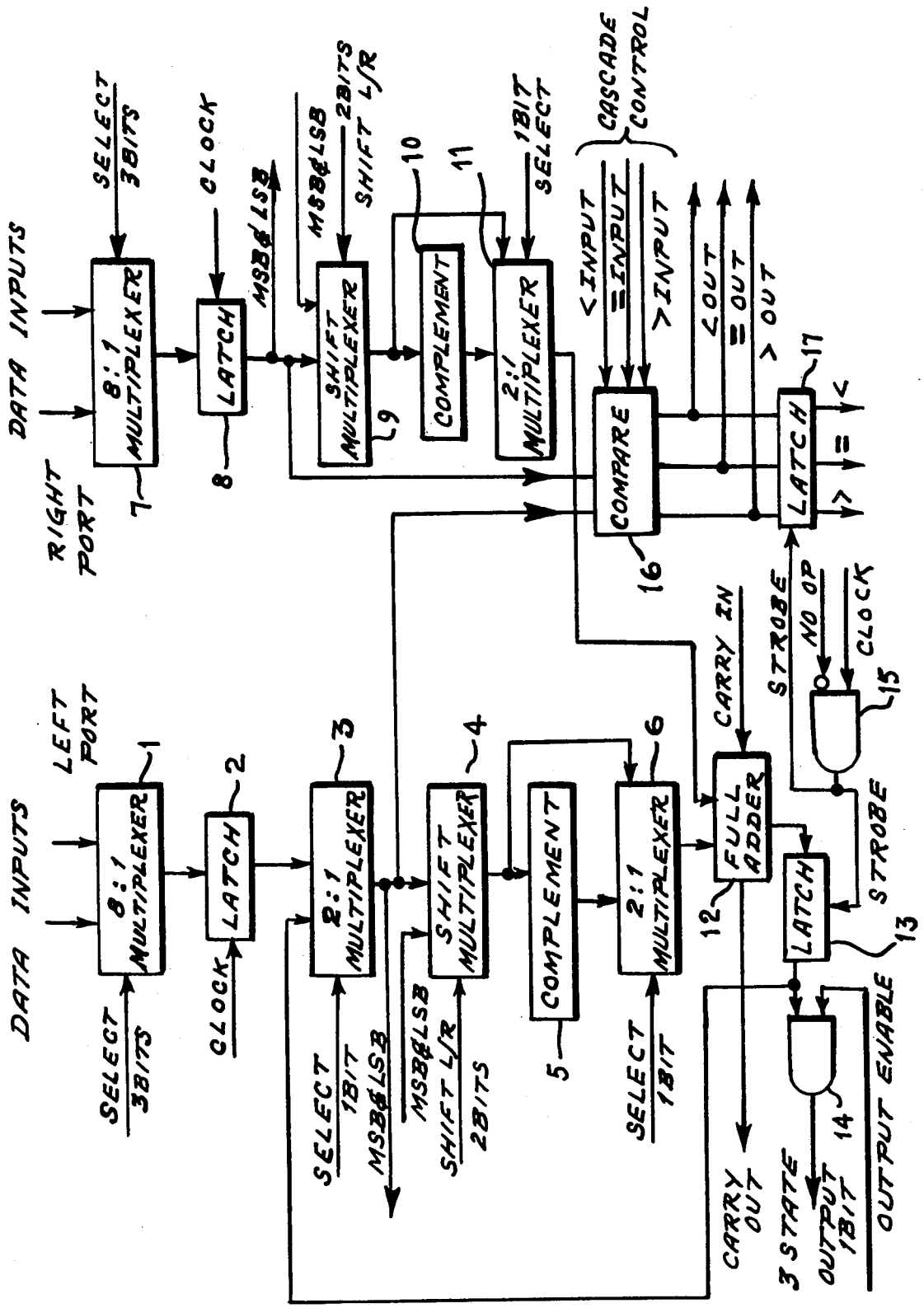

PROGRAMMABLE ARITHMETIC LOGIC UNIT

STATEMENT OF GOVERNMENT INTEREST

The invention described herein may be manufactured and used by or for the Government for governmental purposes without the payment of any royalty thereon.

BACKGROUND OF THE INVENTION

This invention relates to signal processing circuits and in particular to an LSI-CMOS/SOS implemented programmable arithmetic logic unit.

The signal processing requirements of advanced radar and communications systems are currently calling for higher speed digital data processing with low power devices. A typical signal processing application in this category is the USAF "HALO signal processor" which requires high speed (8-16 MHz) bit sliced, pipelined computation of large arrays in space at low power.

State-of-the-art signal processing elements are generally incapable of producing these processing speeds at acceptable power levels. The most effective processing element currently available is the RCA Corporation "ATMAC data execution unit" that is developed from CMOS/SOS for very high speed and low power sequential operation. The ATMAC unit, however, does not execute its arithmetic operation simultaneously and therefore is effectively slower than the processing speeds required. Also the ATMAC unit cannot input and output data simultaneously and it utilizes a single shared bus. The single shared bus uses more power due to the additional capacitance loads that must be driven.

The programmable arithmetic logic unit of the present invention is microprogrammable and operates in conjunction with a fast microprogram store (control store) program memory and a program controller. As distinguished from the RCA device and other prior art processing elements it performs all of its operations simultaneously at high speed—low power factor related to the CMOS/SOS technology. Power requirements are reduced by means of an 8:1 input multiplexer and separate input and output buses. It simultaneously performs duel port 8:1 input data selection and fetch, shifts either port left or right, complements, adds, compares, and provides a latched tri-state output to an external device. All of these operations are programmable and are performed simultaneously in one clock period. The overall effect of the combination of techniques and improvements is to provide a processing device having increased processing speed and reduced power requirements.

SUMMARY OF THE INVENTION

The invention is a programmable arithmetic logic unit designed for use as a signal processing element in the filter and encoder units of a signal processor. It operates in conjunction with a fast microprocessor store program memory and a program controller. Structurally it is fabricated as a layered LSI circuit using CMOS/SOS technology. Functionally it comprises two signal processing channels each having a latched input multiplexer that accepts 4 bit words from 8 separate sources and selects data to be operated on in response to select signals from the program memory. The data are latched and operated on during the next clock while new data is simultaneously fetched. Each channel also includes a shift multiplexer, a data complement function and a complement select multiplexer, all functions being controlled by the program memory. One channel also includes an operand select function. Data from the two signal processing channels are summed in a full adder and its three state output is latched and strobed through an output AND gate. A compare function is also provided for the two signal processing channels. Five 4 bit slice devices are cascaded in a pipeline configuration to provide a full multiply function with a 4 bit multiplier and a 16 bit multiplicand.

It is a principal object of the invention is to provide a new and improved programmable arithmetic logic unit.

It is another object of the invention to provide a programmable arithmetic logic unit that performs at higher speeds than currently available devices of that type.

It is another object of the invention to provide a programmable arithmetic logic unit that has lower power requirements than currently available devices.

It is another object of the invention to provide a low power high speed programmable arithmetic logic unit that is fabricated as a CMOS/SOS LSI circuit.

It is another object of the invention to provide a low power high speed programmable arithmetic logic unit in which all operations are programmable and are performed simultaneously in one clock period.

These together with other objects, features and advantages of the invention will become more readily apparent from the following detailed description when taken in conjunction with the illustrative embodiment in the accompanying drawing.

DESCRIPTION OF THE DRAWING

The sole FIGURE of the drawing is a functional block diagram of the programmable arithmetic logic unit of the invention.

DETAILED DESCRIPTION OF THE PREFERRED EMBODIMENT

The programmable arithmetic unit (PAU) of the invention is preferably fabricated as an LSI circuit utilizing CMOS/SOS techniques. Multiple cascaded slice elements are arranged in a pipeline configuration to achieve a full multiplier function. The sole FIGURE of the drawing illustrates the PAU circuit configuration of one slice. The circuit comprises two signal processing channels designated as LEFT PORT and RIGHT PORT. The first channel comprises input multiplexer 1, latch 2, operand select multiplexer 3, shift multiplexer 4, data complement function 5, and complement select multiplexer 6. The second channel comprises input multiplexer 7, latch 8, shift multiplexer 9, data complement function 10 and complement select multiplexer 11. The outputs of the signal processing channels are summed in full adder 12 and outputted through output latch 13 and output AND gate 14. Compare function 16 compares channel data and its output is latched by latch 17. Latches 13 and 17 are strobed through AND gate 15 by the system clock. The PAU is designed to operate with a high speed program memory and a program address controller. Structurally, each 4 bit slice PAU device requires 103 pins including 2 pins for power. All operations hereinafter described occur simultaneously in one clock tick in a pipelined fashion. The program memory supplies a 14 bit instruction word to the PAU. Six bits of the word selects input data for 2 ports from 8 sources each. The data is latched and operated on during the next clock while new data is simultaneously fetched. The left input port receives an instruction bit to select between output and input data as an operand. Two instruction bits are received by each port to cause a 1 bit shift in the left or right direction or none. The MSB's and LSB's are transferred between the 4 bit slices for cascading the shift operation. One instruction bit is received by each port to select the complement of the word for subtraction. The two ports are next fed into a full adder whose output is latched by the clock. "Carry In" and "Carry Out" are used to cascade the chips. The adder along with the shift multiplexer and complement provide a 1 bit multiplier capability with each clock tick. The multiplier or divider word must be decoded externally, such as in the address controller to determine if the multiplicand is added to the product. The output latch is not updated during a no-op instruction. Five slices are required to perform a full multiply function with a four bit multiplier and a 16 bit multiplicand.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. In combination with a high speed program memory and a program address controller a programmable arithmetic logic unit having an output, said programmable arithmetic logic unit comprising:
    at least one m bit circuit element, m being an integer, having first and second channels,
    said first channel comprising
    a first input multiplexer receiving n, m bit data inputs, n being an integer, said first input multiplexer being controlled by a select signal from said program memory,
    a first latch means receiving and outputting the output of said first input multiplexer, said first latch means being strobed by a clock and holding the output of said first input multiplexer during a clock count,
    an operand select multiplexer receiving the output of said first latch means and the output of said programmable arithmetic logic unit and outputting one of said received outputs in response to a select signal from said program memory,
    a first shift multiplexer receiving the output of said operand select multiplexer and outputting shifted and non-shifted data in response to shift signals from said program memory,
    a first data complement means receiving the output of said first shift multiplexer and
    a complement select multiplexer receiving the output of said first data complement means and the output of said first shift multiplexer and outputting one of said received outputs in response to a select signal from said program memory;
    said second channel comprising
    a second input multiplexer receiving n, m bit data inputs, n being an integer, said second input multiplexer being controlled by a select signal from said program memory,
    a second latch means receiving and outputting the output of said second input multiplexer, said second latch means being strobed by a clock and holding the output of said second input multiplexer during a clock count,
    a second shift multiplexer receiving the output of said second latch means and outputting shifted and non-shifted data in response to shift signals from said program memory,
    a second data complement means receiving the output of said second shift multiplexer, and
    a second complement select multiplexer receiving the output of said second data complement means and the output of said second shift multiplexer and outputting one of said received outputs in response to a select signal from said program memory; and,
    adder means receiving the output of said first channel complement select multiplexer and the output of said second channel complement select multiplexer and providing an arithmetic logic unit output therefrom.

2. In combination with a high speed program memory and a program address controller a programmable arithmetic logic unit as defined in claim 1 including
    an output latch receiving the output of said adder means and being strobed by a clock, and
    an AND gate receiving the output of said output latch and an output enable signal from said program memory and outputting a three state output.

3. In combination with a high speed program memory and a program address controller a programmable arithmetic logic unit as defined in claim 2 including a comparison circuit, said comparison circuit comprising
    a comparator means receiving the output of said first channel operand select multiplexer and the output of said second channel latch means, and
    an output latch receiving the output of said comparator means.

4. In combination with a high speed program memory and a program address controller a programmable arithmetic logic unit as defined in claim 3 wherein m=4 and n=8.

5. In combination with a high speed program memory and a program address controller a programmable arithmetic logic unit as defined in claim 4 wherein said m bit circuit elements are LSI CMOS/SOS slices.

* * * * *